June 18, 1929.  E. D. SAWYER  1,717,629
SIGNALING DEVICE FOR VEHICLES
Filed March 12, 1923   3 Sheets-Sheet 1
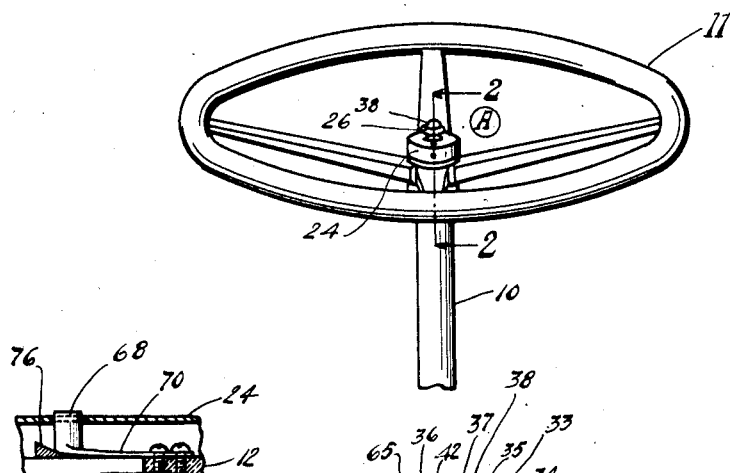
Fig.1
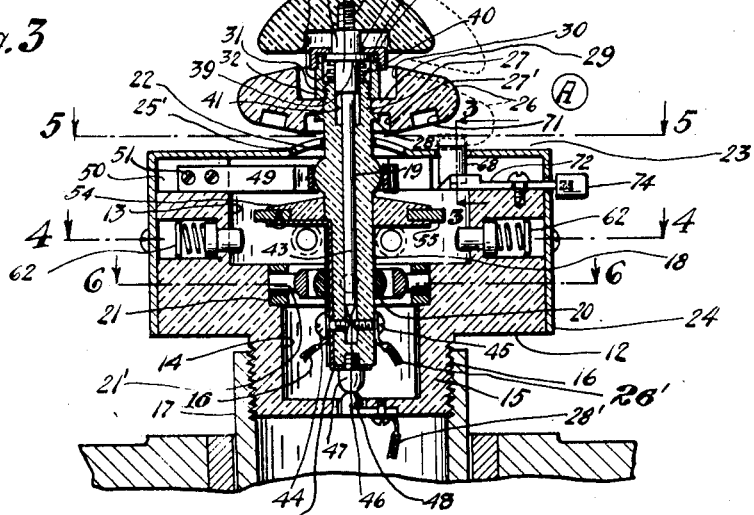
Fig.3
Fig.2
Witnesses:
Inventor:
Emerson D. Sawyer
His Attorney June 18, 1929.　　　E. D. SAWYER　　　1,717,629
SIGNALING DEVICE FOR VEHICLES
Filed March 12, 1923　　　3 Sheets-Sheet 2

Witnesses:

Inventor
Emerson D. Sawyer his Attorney.

June 18, 1929.  E. D. SAWYER  1,717,629
SIGNALING DEVICE FOR VEHICLES
Filed March 12, 1923  3 Sheets-Sheet 3

Inventor:
Emerson D. Sawyer
By Joshua R H Potts
His Attorney

Patented June 18, 1929.

1,717,629

UNITED STATES PATENT OFFICE.

EMERSON D. SAWYER, OF CHICAGO, ILLINOIS, ASSIGNOR OF ONE-HALF TO PAUL H. BONFIELD, OF CHICAGO, ILLINOIS.

SIGNALING DEVICE FOR VEHICLES.

Application filed March 12, 1923. Serial No. 624,455.

My invention relates to improvements in signaling devices for vehicles and has for its principal object the provision of an improved construction of this character which will be highly efficient in use.

The present invention constitutes an improvement over that disclosed in my prior application filed in the United States Patent Office on or about February 2, 1923, Serial No. 616,264.

Among other objects of the invention is the provision of a circuit controlling means connected in circuit with a series of lamps whereby any two pairs of lamps can be caused to burn.

Other objects will appear hereinafter.

The invention consists in the combinations and arrangements of parts hereinafter described and claimed.

The invention will be best understood by reference to the accompanying drawings forming a part of this specification and in which, Fig. 1, is a perspective view of a steering wheel of a vehicle showing the invention associated therewith;

Fig. 2, is a sectional view of the invention taken substantially on line 2—2 of Fig. 1;

Fig. 3, is a fragmentary sectional view taken substantially on line 3—3 of Fig. 2;

Figure 4:
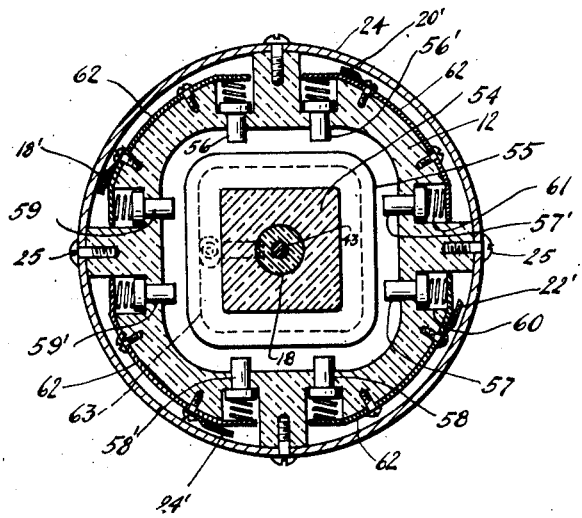
Fig. 4, is a sectional view taken substantially on line 4—4 of Fig. 2.
Figures 5, 6:
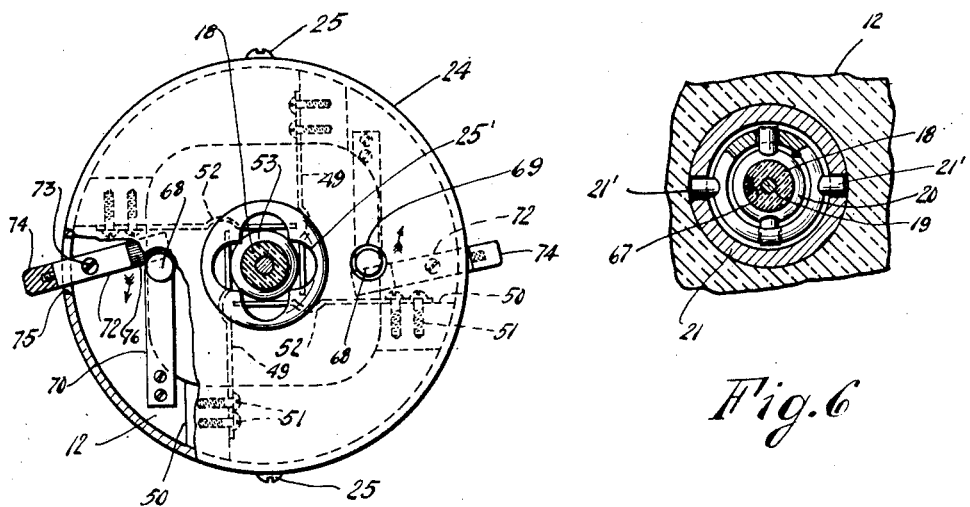
Fig. 5, is a sectional view taken substantially on line 5—5 of Fig. 2.
Fig. 6, is a fragmentary sectional view taken substantially on line 6—6 of Fig. 2.

Referring to the drawings, showing the preferred form of construction 10 indicates a steering wheel column, 11 the steering wheel and A, the switch controlling the circuits of the signaling lights of the vehicle to be hereinafter mentioned.

The switch A as shown in Fig. 1 is free of rotation with the steering wheel and includes a switch block 12 having a central cavity 13 formed in the upper portion thereof and a central cavity 14 of reduced diameter and in communication with the cavity 13. The block 12 carries an extension 15 into which the cavity 14 extends and which has screw threads formed in its outer peripherey as indicated at 16. The extension 15 is adapted to be threaded into a nipple 17 carried by the steering column 10.

Mounted for pivotal movement in four directions is a stem 18 provided with a central cavity 19 and pivoted to a collar 20 which is in turn pivoted to a collar 21 as indicated at 21'. The collar 21 is mounted at the upper portion of the cavity 14, as best shown in Fig. 2. The upper end of the stem 18 projects through a central opening 22 formed in an enclosure 23 having its side walls 24 extending over the periphery of the block 12 and removably fixed thereto by screws 25. The enclosure 23 is provided with radially extending slots 25' extending from the central opening 23 substantially at right angles with respect to each other to permit the stem to be pivoted in four directions from a perpendicular vertical plane.

Means is also provided for pivoting the stem 18, this means in the present instance includes an operating knob 26 having a cavity 27 formed in its bottom thereof. The wall 27' of the cavity rests upon an annular flange 28 formed on the stem as shown. The outer end of the stem projects above the bottom 29 of an upper cavity 30 formed in the operating knob 26, and this projecting end portion is threaded as indicated at 31 for engagement with a sleeve 32, the sleeve 32 being adapted to hold the operating knob in position on the stem 18. Threaded on the end portion 33 of the sleeve 32 is a cap 34 having a central opening 35 formed therein through which an enlarged cylindrical portion 36 is adapted to work, said cylindrical portion being provided with a threaded stud 37 for threaded engagement with an operating knob 38. Below the cylindrical portion 36 is a collar 39 adapted to abut the cap 34 and work in the space 40 between the outer extremity of the stem and the cap. The outer extremity of the stem 18 is provided with an enlarged cavity 41 within which a reduced cylindrical portion 42 is adapted to work, said cylindrical portion carries a plunger 43 working in the cavity 19. The plunger 43 by manipulating the operating knob 38 is adapted to close a circuit between contact elements 44 and 45, said plunger being provided with a tapered extremity as indicated at 46. The stem 18 carries at its lower end, that is the end extending into the cavity 14, a contact element 47 which is adapted to engage a contact element 48 when the same is in a perpendicular position; the circuit arrangement of the contact elements above mentioned will be fully set forth in the description to follow with reference to the electrical circuit of the signaling device.

Means is provided for returning the stem to its initial position after manipulating the stem to pivot from such position. This means comprises spring members 49 disposed at right angles with respect to each other and fixed to shoulders 50 by screws 51, said spring members being provided with buckled portions as indicated at 52 and the extremities of the spring members are adapted for contact with an annular enlarged portion 53 formed on the stem 18 as shown.

Referring now to Fig. 4, it will be seen that the stem carries a rectangular plate 54 formed of non-conducting material and having a peripheral edge 55 of conducting material. The peripheral edges of conducting material are adapted for engagement with contact elements 56—56', 57—57', 58—58', and 59—59' mounted in cavities 60 formed in the block 12 and controlled by spring members 61. The contacts 56—56' to 59—59' inclusive are connected together in pairs by conductors 62, as shown in Fig. 4. The peripheral edge 55 is connected by a conductor 63 to the contact element 44 carried by the stem 18.

Figure 7:
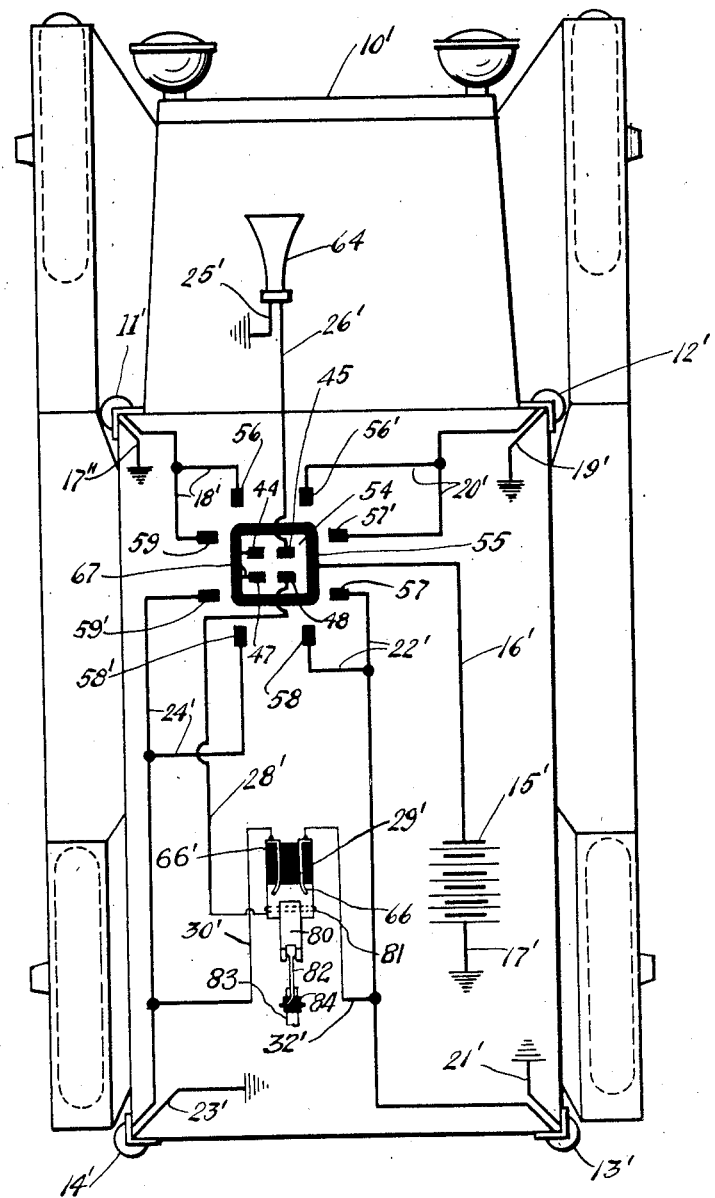
Fig. 7, is a diagrammatical view illustrating an electric signaling system constructed in accordance with an embodiment of the invention.

Referring now to Fig. 7, in which a diagrammatical plan view of the electrical circuit system is shown in accordance with the embodiment of the invention, 10' indicates a vehicle of any approved type and 11', 12', 13' and 14' indicate the signal lamps carried by the body of the car in such position that any two lamps can be observed from any position with respect to the front and rear or sides of the car; and 15' indicates a suitable source of electrical supply connected by a circuit 16' to the peripheral edges 55 of the plate 54. The source of supply is also grounded to the body of the car by a conductor 17'. The lamp 11' is grounded to the vehicle by a conductor 17" and is also connected by conductors 18' to the contact elements 56 and 59. The lamp 12' is grounded to a vehicle by a conductor 19' and is also connected by conductors 20' to contact elements 56' and 57'. The lamp 13' is grounded to the vehicle by a conductor 21' and is connected by conductors 22' to contact elements 57 and 58. The lamp 14' is grounded to the vehicle by a conductor 23' and is connected by conductors 24' to contact elements 59' and 58'. The arrangement thus far set forth fully discloses the circuit of the lamps as controlled by the pivotal contact member or peripheral edge 55 of the block 54 operable by the pivotal movement of the stem 18.

A horn 64 is diagrammatically illustrated in Fig. 7 and is grounded to the body of the vehicle by a conductor 25' and connected to the contact element 45 by a conductor 26'. The circuit is closed between the source of electrical supply and the horn by means of the plunger 43 by a downward movement thereof so as to bring its end 46 into contact with the elements 44 and 45, the plunger being returned automatically to its initial position by a spring member 65 surrounding the portion 42 of the same and arranged between the upper extremity thereof and the collar 39, as best shown in Fig. 2.

The contact element 48 is adapted for contact with the contact element 47, when the stem 18 is in its initial position said contact element 47 being in connection with the end 67 of the conductor 63. The contact element 48 is connected by the conductor 28' to one metallic brake drum 29' of the automobile, the contact 80 of the brake operated switch 29' shown diagrammatically in Figure 7. The switch 29' may be any suitable type of brake operated switch except that it closes two contacts instead of one. The switch illustrated has two stationary contacts 66 and 66' supported below the frame of the automobile and insulated therefrom and from each other. A moving contact 80 co-operates with the contacts 66 and 66' and is connected to the brake rod 83 by means of the link 82, which is insulated from the frame of the car as at 84. When the brake lever is operated to set the brakes, the consequent motion of the brake rod 83 closes the contacts 80, 66 and 66'. When the brake is released, these contacts open. The lights 13' and 14' are connected by means of the conductors 30' and 32' to the contacts 66 and 66'. When the contact 80 is closed to contacts 66 and 66' the lights 13' and 14' are lighted provided the stem 18 is in its normal position. The signal lamps will continue to burn as long as the brake mechanism is applied and the stem 18 is in its initial position, but upon movement of the stem, the contact element 47 is moved away from the contact element 48 and the circuit is broken. By movement of the stem to break the circuit the conductor 55 is brought into contact with the contact elements controlling the pairs of side lamps located in the direction of such movement of the stem and this will cause one of the lamps 11' or 12' to burn with one of the lamps 13' and 14' the arrangement being especially designed to serve for parking purposes when it is desired to park the vehicle and only have two side lamps burning.

It is apparent from the disclosure herein that when the stem 18 is moved into contact with any pair of contact elements, a pair of lamps, considering the peripheral pairs, will be caused to burn and convey the intention of the driver of the vehicle to other drivers of vehicles, the direction he intends to travel.

When either side pair of lamps are used for parking purposes it is necessary to prevent return of the stem to its initial position and this is accomplished by providing a dog 68 projecting through an opening 69 formed in the top of the enclosure 23, there being two such dogs provided, one on the right side and one on the left side of the stem. The dog 68 is carried by a leaf spring 70. The dog 68 is adapted to be raised into engagement with a socket 71 formed in the operating handle 26 when pivoted toward the dog. This raising of the dog is accomplished by a lever 72 pivoted at 73 and provided with an operating handle 74 and working in a slot 75. By pivoting the lever 72 a wedge-shaped member 76 carried thereby passes under the leaf spring 70 and forces the dog 68 upwardly into the socket 71. The dog engaging the socket will hold the stem 18 against pivotal movement until it is removed therefrom by pivoting the leaf in the opposite direction so as to permit return of the leaf spring 70 to its initial position.

By this provision either the left pair or right pair of lamps can be caused to continuously burn.

It will be seen from the description herein that I provide a circuit controlling means adapted to be incorporated in an electrical signaling system for operating pairs of lamps so that signals by means of the burning lamps will inform other vehicle drivers what direction the vehicle with which my invention is associated, is about to take.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claim.

Having described my invention what I claim as new and desire to secure by Letters Patent, is:

The combination with an automobile of four peripheral electric lamps at the four corners thereof; a vertically arranged universally swinging switch member carrying electric contacts; an electrical connection through each of said lamps and the contacts of said switch; a brake operable switch having two contacts insulated from each other and a contact closable thereto, electrically connected to one contact of said first named switch; electrical connections from the lamps on the rear corners of the automobile to the contacts of said brake switch; and means on said first named switch for closing circuits for selectively lighting any pair of said lamps when said first named switch is swung, and for lighting the rear pair of lamps only, when said first named switch is normal and said brake switch is closed, substantially as described.

In testimony whereof I have signed my name to this specification.

EMERSON D. SAWYER.